(12) United States Patent
Le Paih

(10) Patent No.: US 7,404,710 B2
(45) Date of Patent: Jul. 29, 2008

(54) METHOD AND DEVICE FOR PRODUCING AND PACKAGING SAUSAGE-TYPE PRODUCTS

(75) Inventor: Jacques Le Paih, Plumeliau (FR)

(73) Assignee: Stork Townsend BV, Oss (NL)

( * ) Notice: Subject to any disclaimer, the term of this patent is extended or adjusted under 35 U.S.C. 154(b) by 489 days.

(21) Appl. No.: 10/470,781

(22) PCT Filed: Jan. 31, 2002

(86) PCT No.: PCT/FR02/00364

§ 371 (c)(1),
(2), (4) Date: Jul. 30, 2003

(87) PCT Pub. No.: WO02/060264

PCT Pub. Date: Aug. 8, 2002

(65) Prior Publication Data

US 2004/0052900 A1  Mar. 18, 2004

(30) Foreign Application Priority Data

Feb. 1, 2001  (FR) .................................. 01 01470

(51) Int. Cl.
*B28B 13/00* (2006.01)
(52) U.S. Cl. ................ 425/382 R; 425/308; 425/133.1; 425/71; 426/276; 426/105; 452/30
(58) Field of Classification Search ............. 425/308, 425/315, 133.1, 67, 68, 71, 382 R; 426/276, 426/105, 277; 452/30
See application file for complete search history.

(56) References Cited

U.S. PATENT DOCUMENTS 3,700,847 A * 10/1972 Rendek et al. .............. 426/241
4,258,066 A *  3/1981 Bernard ..................... 426/231
4,392,801 A *  7/1983 Meyer ......................... 425/71

(Continued)

FOREIGN PATENT DOCUMENTS

DE  2515067  * 11/1976

(Continued)

OTHER PUBLICATIONS

PCT Notification De Transmission Du Rapport D'Examen Preliminaire International and PCT Rapport D'Examen Preliminaire International.

(Continued)

*Primary Examiner*—Yogendra Gupta
*Assistant Examiner*—Maria Veronica D Ewald
(74) *Attorney, Agent, or Firm*—Winston & Strawn LLP; Richard P. Gilly

(57) ABSTRACT

According to this method, the products are produced by continuously co-extruding a bead (B) coated with a starting base comprising hydrocolloids so as to form a skin by calcium gelation when the sausage passes into the elongated gelation bath (2), said bead then being shared out into portions (P) placed in trays (C)

Figure 1:
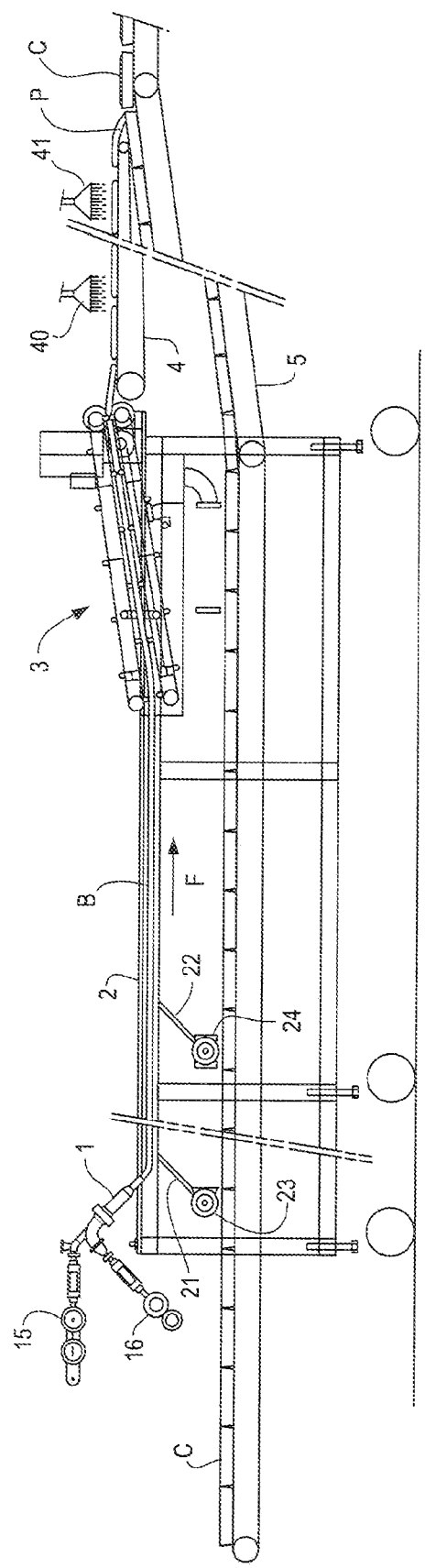

Many beads (B) are co-extruded by parallel co-extrusion heads, (1) transit into a common gelation bath (2), are brought side by side so as to then be placed into portions by given means (3) acting on all said beads (B) so as to form batches of identical products perfectly grouped and aligned so as to be loaded into their packaging tray (C).

8 Claims, 4 Drawing Sheets

U.S. PATENT DOCUMENTS

| | | | | |
|---|---|---|---|---|
| 4,902,523 | A | * | 2/1990 | Fritchen et al. .............. 426/231 |
| 5,118,519 | A | * | 6/1992 | Mally et al. .................. 426/513 |
| 5,242,289 | A | * | 9/1993 | Forgash et al. ................ 425/71 |
| 5,696,800 | A | * | 12/1997 | Berger ........................ 375/361 |
| 5,759,602 | A | * | 6/1998 | Kobussen et al. ........... 426/241 |
| 5,811,146 | A | * | 9/1998 | Marra et al. ................ 426/513 |
| 6,013,295 | A | * | 1/2000 | Kobussen et al. ........... 426/277 |
| 6,054,155 | A | * | 4/2000 | Kobussen et al. ............. 426/92 |
| 6,089,845 | A | * | 7/2000 | Morgan et al. ................ 425/67 |
| 6,471,042 | B1 | * | 10/2002 | Van De Dungen et al. .. 198/703 |
| 6,551,637 | B1 | * | 4/2003 | Fontenille .................... 426/89 |
| 6,814,996 | B2 | * | 11/2004 | Murray et al. .............. 426/582 |
| 6,988,943 | B2 | * | 1/2006 | Reutter et al. ................. 452/40 |

FOREIGN PATENT DOCUMENTS

| | | | |
|---|---|---|---|
| NL | 9201307 | * | 7/1992 |
| WO | WO00/44233 | * | 8/2000 |

OTHER PUBLICATIONS

PCT Rapport De Recherche Internationale.

* cited by examiner

METHOD AND DEVICE FOR PRODUCING AND PACKAGING SAUSAGE-TYPE PRODUCTS

The present invention concerns the production of sausage type products and the packaging said products into trays.

Within the context of the present invention, these products consist of a bead made up of minced meat or fish and/or vegetables covered with a skin and shared out into portions, whose section may be any shape but more generally round. As regards the production of these products, these are obtained by co-extruding a bead coated with a starting base comprising one or several hydrocolloids such as sodium alginate or pectate, pectin, carraghenates, etc., said base being intended to form the skin via calcium gelation in a bath downstream of the co-extrusion means. After having being immersed for a specific period in the bath, the bead is portioned, rinsed, dried and then packed. In a continuous production method, the bead at the outlet of the co-extrusion head passes into the horizontally elongated gelation bath so as to determine the required immersion time. For further information, reference could be made to the related French patent application filed on the same date and under the same name as the present invention and entitled "Sausage type product and its producing method".

The invention concerns optimisation of the method for producing and packaging these products and the device for implementing said method by exploiting specific characteristics linked to the method of production by means of co-extrusion and gelation and also the specific characteristics as regards the products.

Thus, the invention firstly proceeds from the fact that several production lines can be placed in parallel so as to produce according to a same co-extrusion speed several sausages transiting in a common gelation bath. Downstream of gelation, the packaging into trays can be facilitated by bringing side by side the sausages formed in parallel before putting them into portions with the same transversal means acting transversally and simultaneously on all the sausages so as to form batches of products of the same length and perfectly grouped and aligned.

In other words, the invention is a method for producing and packaging sausage type products according to which said products are produced by continuously co-extruding a bead coated with a starting base including one or several hydrocolloids and intended to constitute a skin via calcium gelation when said bead passes into the elongated gelation bath, said sausage then being split into portions intended to be packaged in trays;

said method is characterised in that several beads are co-extruded in parallel and according to a same co-extrusion speed, are made to transit in a common gelation bath and are brought to be side by side so as to be then be put into portions by the same means acting transversally on all said beads so as to form batches of identical products perfectly grouped and aligned to be then loaded into their packaging tray.

The invention also concerns a device for implementing said method, characterised in that it includes: a plurality of transversally aligned co-extrusion heads, a gelation container horizontally elongated and in the extremity upstream of which said co-extrusion heads discharge; means for bringing side by side the formed sausage before being placed into portions; common means for portioning the sausages transversally acting on said sausages brought together; and means for loading the batches of products formed at the outlet of said portioning means into their trays.

According to other preferred characteristics of the invention concerning the device, said means to bring side by side said sausages are guides placed in the downstream extremity portion of said gelation container;

the portioning means consist of two identical synchronized endless belts placed with one above the other so to form between them a passage vertically narrowing from upstream to downstream for said beads brought to be side by side, said endless belts comprising transversal anvils passing opposite one another in said passage so as to progressively squeeze said beads from upstream to downstream and finally cut them;

a first belt conveyor orientated longitudinally receives the portion batches formed at the outlet of said portioning means and provided along the latter are means for rinsing said portions with which they are advantageously associated downstream of drying means;

the portion batches are transferred via gravity at the strand of said belt conveyor, a second belt conveyor belt being placed under the latter so as to transport at the same speed and in the same direction an accumulation of said trays by making them pass through a loading position immediately below the downstream extremity of the first conveyor belt.

Figure 2:
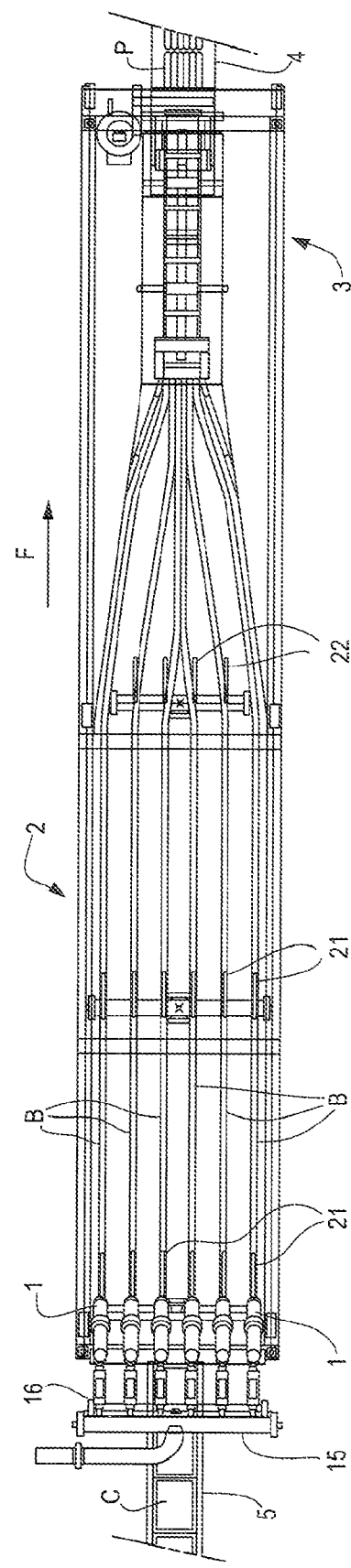
Figure 3:
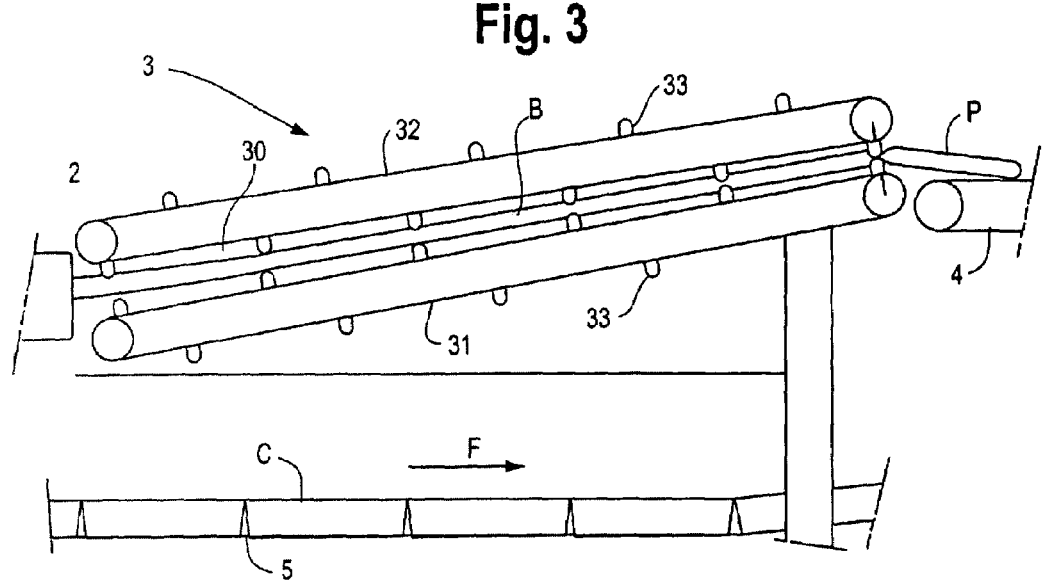
Figure 4:
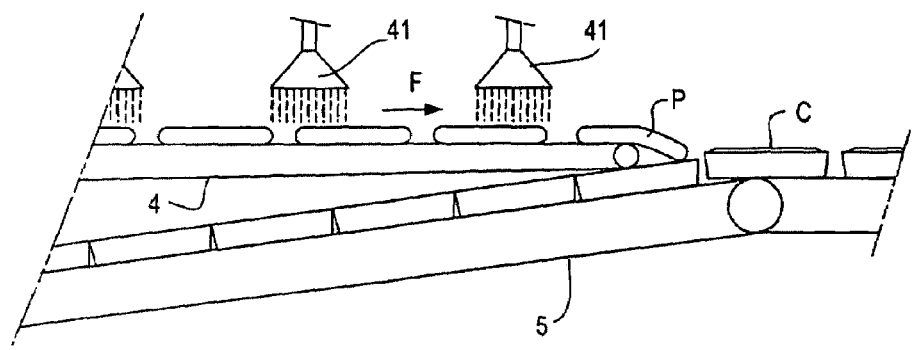
Figure 5A:
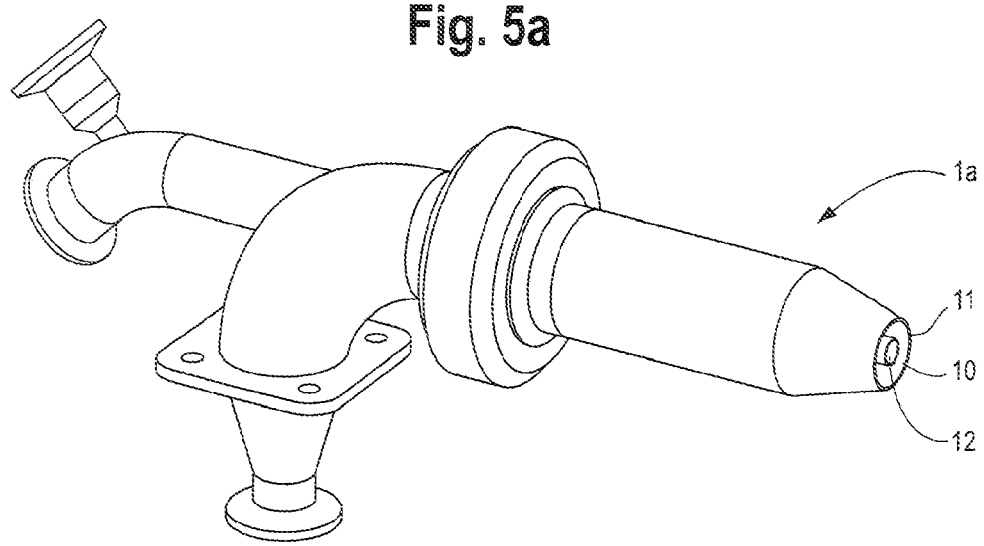
Figure 5B:
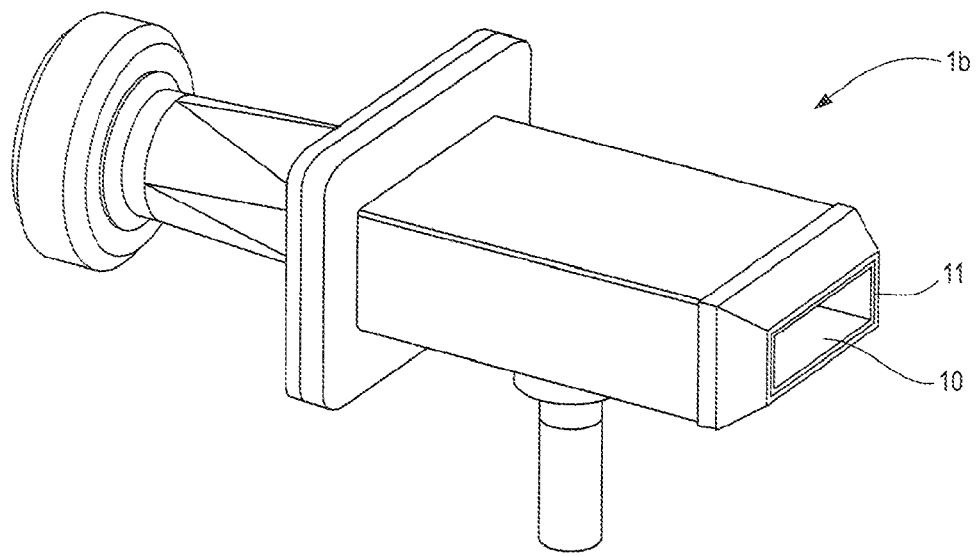

The characteristics and advantages of the invention, as well as other related specific characteristics, shall clearly appear from a reading of the following description with reference to the accompanying drawings on which:

FIG. 1 is a side diagrammatical view of a device according to the invention,

FIG. 2 is a top diagrammatical view corresponding approximately to FIG. 1, but not showing the downstream packaging portion, FIG. 3 is a side diagrammatical view on larger scale of the portioning unit of the device of FIGS. 1 and 2, FIG. 4 is a side diagrammatical view on larger scale of the downstream packaging portion of the same device, and FIGS. 5a and 5b are perspective diagrammatical views of two examples of co-extrusion heads able to be used according to the invention.

With reference firstly to FIGS. 1 and 2, these figures basically represent the main part of a device according to the invention and comprising at its upstream extremity a plurality of transversally aligned co-extrusion heads 1. Although the latter can be fed individually, so as to for example allow for the production of mixed products, on FIG. 2 they are shown connected via their inlets to common transversal feeding collectors 15, 16. In the two cases, adjustment means are provided to equalise the co-extrusion speed on all the heads 1.

The co-extrusion heads are oriented so as to discharge downstream of the device into the upstream extremity of a gelation container 2 and preferably slightly above the surface of the gelation bath. The container 2 is not very deep and has a flat bottom and is longitudinally elongated (along the arrow F), its length being determined according to the co-extrusion speed and passage or immersion time required for the beads B formed at the outlet of the co-extrusion heads 1 in the gelation bath. In the container 2, guiding passages (not shown) can be formed in the longitudinal alignment of the co-extrusion heads 1.

The marks 21 and 22 respectively denote the flow-back and suction pipes inserted in the bottom of the gelation container 2 and which are joined together in a recycling circuit of the gelation bath. Secondly, they are placed in such a way so as to create a flow or current along the arrow F in the gelation bath which shall contribute in having the beads B move forward.

To this effect, the flow-back pipes 21 are placed upstream of the suction pipes 22, and preferably, as diagrammatically shown on FIG. 2, are placed in rows aligned with the co-extrusion heads 1 and connected to said recycling circuit by respective transversal collectors 23 and 24.

Moreover, and according to an important characteristic of the invention, the downstream portion of the container 2 comprises guiding means which are used to bring together all the beads B so as to form a bundle where they are brought to be in contact side by side. To this effect and as represented, the container 2 has in its downstream portion which forms a converging section so as to guide the beads B the most externally situated, whereas the others are guided by walls (not shown).

A portioning unit 3 receives said bundle of beads B brought into contact side by side at the outlet of the gelation container 2. It comprises means to transversally squeeze said bundle at regular periods of time defining the length of the portions P. From upstream to downstream in the unit 3, this squeezing is gradual and directly ends before the outlet by a transversal sectioning of said bundle. In the embodiment shown and more clearly visible on FIG. 3, the unit 3 is constituted by two endless belts 31, 32 placed with one on top of the other and forming between their opposite strands a passage 30 which narrows from upstream to downstream. The squeezing means are transversal anvils 33 placed according to a given spacing on the endless belts 31 and 32. The two endless belts 31, 32 are synchronized to allow the anvils 33 to move by pairs opposite each other along the passage 30. Preferably, the anvils 33 are profiles with a certain elasticity enabling them to be slightly crushed and to this effect can be hollow profiles with a rounded top as shown and be advantageously made of elastomer. Indeed, the running off speed in the unit 3 is the same as the co-extrusion speed, given the fact that it is the unit 3 which positively drives the beads B formed by the co-extrusion heads 1.

The portions P come out of the unit 3 thus forming batches inside which they are identical with a perfect alignment of their front and rear extremities and brought into contact side by side. These batches are immediately taken up onto a first belt conveyor 4 along which the portions P can firstly be rinsed by means of small showers 40 and then dried by dryers 41.

As regards loading the batches of the portions P into the trays and as shown more clearly on FIG. 4, in association with the first belt conveyor 4 a second belt conveyor 5 is placed below transporting an accumulation of the tray type containers C and making them move into the loading position, that is immediately below the outlet extremity of the belt 4, said extremity preferably being as shown of a sword type. The belts 4 and 5 are synchronized so as to the portions batches P are placed by simple gravity in the trays C intended to receive them.

FIGS. 5a and 5b, by way of the examples of co-extrusion heads 1a and 1b they represent, illustrate the fact that multiple variants of products can be produced with the device of the invention. The co-extrusion head 1a is provided for producing products with a round section, and moreover, as an option, makes it possible to fill the core of the products by a third central outlet 12 in addition to its main outlet 10 and peripheral outlet 11, whereas the co-extrusion head 1b is used to embody rectangular sections.

There now follows a description of one example for implementing the device of the invention so as to produce meat sausages:

A preparation of the following is firstly made for constituting the skin on the sausage meat:

a) a base by adding in water about:
  5% in weight of sodium alginate,
  2% in weight of anhydrous di-calcic phosphate,
  1% in weight of potassium sorbate,
  10% in weight of a sugar load
b) a gelation bath by adding to the water:
  2% in weight of calcium lactate;
  1% in weight of citric acid.

The base has been loaded into a tank feeding the peripheral outlet 11 (FIGS. 5a and 5b) of the co-extrusion heads 1 and the gelation bath in the elongated container 2. The co-extrusion heads 1 have been adjusted so as to deliver according to the ratio in weight of 90 to 99% for the meat of the sausage via their outlet 10 and the 100% complement for said base intended to constitute the skin via their peripheral outlet 11. The beads formed pass through the gelation bath and are driven by the portioning unit 3 and also by the flow created in the bath by the recycling circuit, said recycling consisting of a continuous supply of calcium lactate.

In the gelation bath, two gelation processes take place simultaneously:
  a gelation process by soaking with free calcium ions abundantly present in the bath; on immersion, an external film of calcium alginate is formed on the external surface of said base,
  a less rapid gelation process by releasing of the calcium ions integrated in said base provoked by the acid pH of the bath.

On leaving the bath, the beads B pass into contact side by side in the portioning device 3, which from upstream to downstream firstly progressively squeezes the bundle of bead B which forces the meat out on each side in each bead and fully flattens the skin over the entire length of the squeezing portion. At this stage, the acid gelation process still taking place is an important advantage in that it creates a weld or solder bridge between the two layers of skin squeezed against each other, thus the making it possible to obtain, after the portioning of the squeezed zone, portions P perfectly closed at their extremities. The portions P placed into batches on the belt conveyor 4 are then transported under small rinsing showers 40 and the driers 41 so as to be loaded at the outlet in the trays C.

The invention claimed is:

1. Device for producing and packaging sausage type products, characterised in that it includes:
  a plurality of transversally aligned co-extrusion heads (1) that extrude a plurality of formed beads;
  a gelation container (2) that is horizontally elongated and is in the upstream extremity of which said plurality of co-extrusion heads (1) discharge said plurality of formed beads (B);
  means for bringing together, side by side the plurality of formed beads (B) prior to a point at which the plurality of formed beads that has been brought side by side is cut up into portions said means comprising a converging section formed by the downstream extremity portion of the gelation container;
  common means (3) for portioning said plurality of formed beads (B) into portions and acting transversally on the plurality of beads that are brought together; and
  means for loading into trays the portions formed at the outlet of said portioning means.

2. Device according to claim 1, characterised in that said means for bringing side by side the beads (B) comprise guides placed in the downstream extremity portion of said gelation container (2).

3. Device according to claim 1, characterised in that the gelation container comprises a circuit for recycling the gelation bath and creating in the latter a flow contributing in making the beads (B) move forward.

4. Device according to claim 1, characterised in that said portioning means (3) comprise two identical synchronized endless belt conveyors (31, 32) with one placed on top of the other so as to form between them for said beads (B) brought side by side a passage (30) narrowing vertically from upstream to downstream, said endless belt conveyors comprising transversal anvils (33) passing opposite each other in said passage so as to progressively squeeze from upstream to downstream said beads (B) and finally cut them up into portions.

5. Device according to claim 4, characterised in that said anvils (33) comprise profiles having a certain elasticity enabling them to be slightly crushed.

6. Device according to claim 5, characterised in that said anvils (33) comprise hollow profiles with rounded tops.

7. Device according to claim 1, characterised in that a first belt conveyor (4) oriented longitudinally receives the batches of portions (P) formed at the outlet of said portioning means (3) along which means are provided for rinsing (40) and drying (41) said portions (P).

8. Device according to claim 7, characterised in that the portion batches (P) are transferred via gravity at the strand of said first belt conveyor (4), a second belt conveyor (5) being placed below the latter so as to transport an accumulation, at the same speed and in the same direction, an accumulation of said trays by making them pass through a loading position immediately below the downstream extremity of the first belt conveyor (4).

* * * * *